United States Patent
Fradlis et al.

(10) Patent No.: US 11,102,533 B2
(45) Date of Patent: Aug. 24, 2021

(54) PREDICTING BREAK DURATIONS IN CONTENT STREAMS

(71) Applicant: Google LLC, Mountain View, CA (US)

(72) Inventors: Igor Fradlis, Woodmere, NY (US); Charles Weill, New York, NY (US); Christopher Dinn, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/341,708

(22) PCT Filed: Feb. 13, 2017

(86) PCT No.: PCT/US2017/017687
§ 371 (c)(1),
(2) Date: Apr. 12, 2019

(87) PCT Pub. No.: WO2018/147879
PCT Pub. Date: Aug. 16, 2018

(65) Prior Publication Data
US 2019/0268644 A1    Aug. 29, 2019

(51) Int. Cl.
*H04N 21/262* (2011.01)
*H04N 21/25* (2011.01)
*H04N 21/81* (2011.01)
*H04N 21/234* (2011.01)

(52) U.S. Cl.
CPC .  *H04N 21/26233* (2013.01); *H04N 21/23424* (2013.01); *H04N 21/251* (2013.01); *H04N 21/812* (2013.01)

(58) Field of Classification Search
CPC ....... H04N 21/26233; H04N 21/23424; H04N 21/251; H04N 21/812
See application file for complete search history.

(56) References Cited

U.S. PATENT DOCUMENTS

| | | | |
|---|---|---|---|
| 2003/0145323 A1 | 7/2003 | Hendricks et al. | |
| 2010/0205049 A1* | 8/2010 | Long ................. | G06Q 30/0252 705/14.5 |
| 2012/0011545 A1 | 1/2012 | Doets et al. | |

(Continued)

FOREIGN PATENT DOCUMENTS

EP    3 110 158 A1    12/2016

OTHER PUBLICATIONS

"Understanding LSTM Networks—Colah's Blog", Aug. 27, 2015, pp. 1-8 (Year: 2015).*

(Continued)

*Primary Examiner* — Benjamin R Bruckart
*Assistant Examiner* — Tien M Nguyen
(74) *Attorney, Agent, or Firm* — Foley & Lardner LLP

(57) ABSTRACT

The present disclosure discusses systems and methods to mitigate traffic spikes in retrieving secondary content items for display in concurrently streamed content streams. The system can pre-fetch secondary content items for the upcoming secondary content slots. To retrieve an appropriate content item, the system can predict the length of the secondary content slot. The system can use the predicted length of the secondary content slot to distribute the traffic spike over a larger span of time to mitigate the spike.

18 Claims, 4 Drawing Sheets

(56) References Cited

U.S. PATENT DOCUMENTS

| | | | | |
|---|---|---|---|---|
| 2012/0289147 | A1* | 11/2012 | Raleigh | H04N 21/6547 455/3.06 |
| 2014/0068662 | A1* | 3/2014 | Kumar | H04N 21/812 725/34 |
| 2016/0253710 | A1* | 9/2016 | Publicover | G06F 16/2358 705/14.66 |
| 2018/0211403 | A1* | 7/2018 | Hotson | G06T 7/60 |

OTHER PUBLICATIONS

International Preliminary Report on Patentability for PCT/US2017/017687, dated Aug. 22, 2019 (8 pages).

International Preliminary Report on Patentability for PCT/US2018/018051, dated Mar. 28, 2019 (10 pages).

International Search Report and Written Opinion for PCT/US2017/017687, dated Sep. 29, 2017 (13 pages).

International Search Report and Written Opinion for PCT/US2018/018051, dated Mar. 23, 2018 (17 pages).

International Written Opinion for PCT/US2018/018051, dated Jan. 3, 2019 (5 pages).

Wikipedia, "Long Short-Term Memory," Wikipedia, dated Dec. 17, 2016, XP002779035, Retrieved from URL: https://en.wikipedia.org/w/index.php?title=Long_short-term_memory&oldid=755252953 (4 pages).

Choo et al., "Background subtraction using LSTM and spatial recurrent neural network", Korea Broadcasting Media Engineering Society 2016 Autumn Conference, Nov. 4, 2016, pp. 13-16 (4 pages).

Office Action for KR Appln. Ser. No. 10-2019-7009841 dated Apr. 24, 2020 (15 pages).

Examination Report for IN Appln. Ser. No. 201927012791 dated Nov. 26, 2020 (8 pages).

Office Action for CN Appln. Ser. No. 201880004122.4 dated Oct. 29, 2020 (11 pages).

Notice of Reasons for Rejection for JP Appln. Ser. No. 2019-519689 dated Aug. 3, 2020 (11 pages).

* cited by examiner

PREDICTING BREAK DURATIONS IN CONTENT STREAMS

BACKGROUND

Content providers can stream media to remote client devices. The streams can include breaks for secondary content, and the secondary content can be provided to the client devices from a secondary server, upon request by said client devices. When the stream content is predetermined such that breaks for secondary content are identified well in advance, client devices may request and receive the content similarly well in advance. However, if the stream content is dynamic or live, the secondary server may not know the length of the of the break in advance and may not be able to select and deliver secondary content of a corresponding length in advance: only once the secondary server is informed of the length of the break can the secondary server can retrieve a secondary content item for delivery to the client device. Because of this delay, if large numbers of client devices simultaneously request secondary content, the secondary server may be unable to fulfill the requests efficiently or in time.

SUMMARY OF THE DISCLOSURE

To provide a scalable system capable of fulfilling large numbers of requests from client devices, a secondary server may generate dynamic estimates of durations of breaks in first content streams, such that secondary content streams may be pre-selected and generated which better match those breaks. Further, such estimates may be generated in advance of any in-band markers that are provided within the first content streams, providing a longer window in which to generate and pre-cache secondary content streams which are specific to each of the plurality of user devices. Additionally, breaks may be determined that allow for first content to be watched simultaneously by a plurality of first users.

The foregoing general description and following description of the drawings and detailed description are exemplary and explanatory and are intended to provide further explanation of the invention as claimed. Other objects, advantages, and novel features will be readily apparent to those skilled in the art from the following brief description of the drawings and detailed description of the invention.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
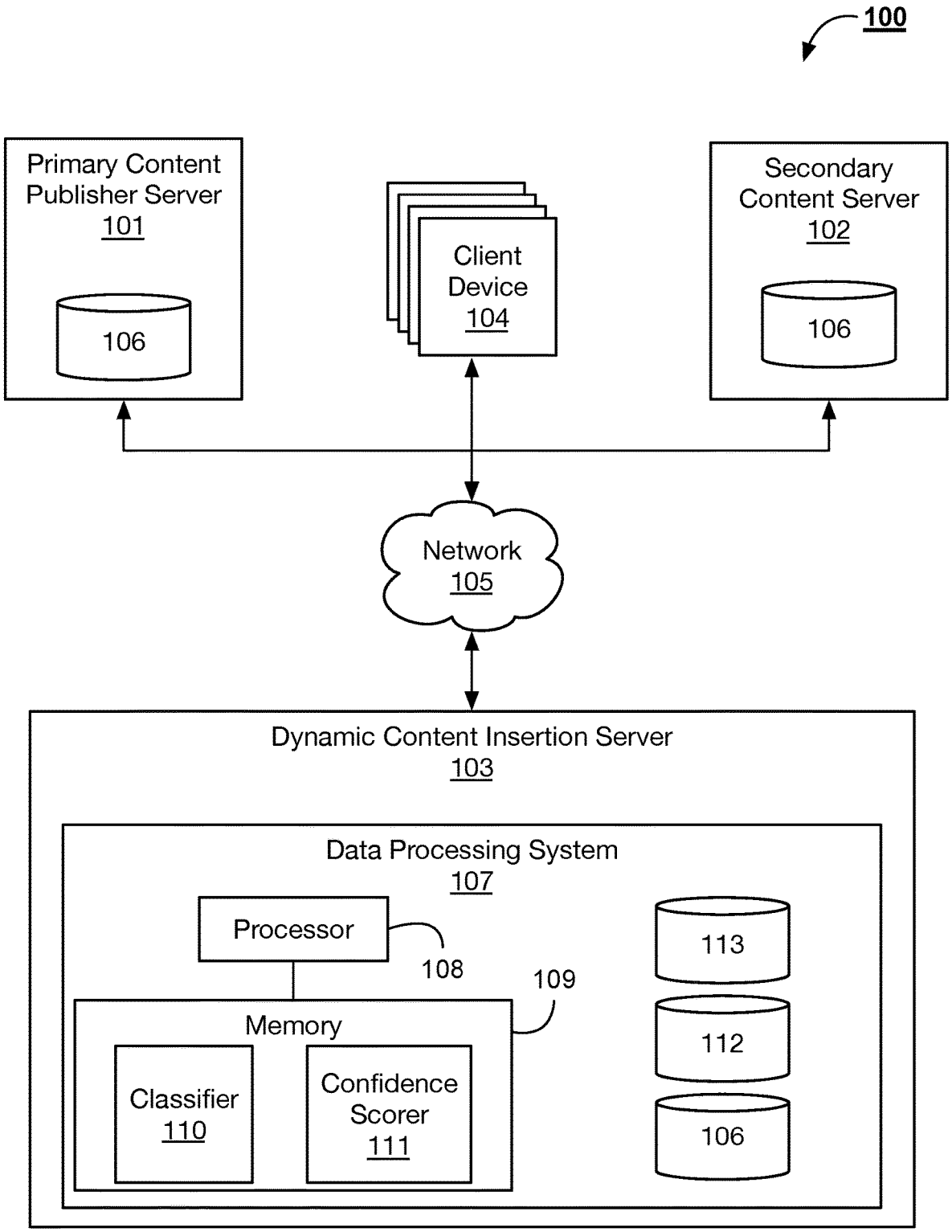
FIG. 1 illustrates a block diagram of a system for predicting break durations in content streams.

The various concepts introduced above and discussed in greater detail below may be implemented in any of numerous ways, as the described concepts are not limited to any particular manner of implementation. Examples of specific implementations and applications are provided primarily for illustrative purposes.

Providing linear/live Dynamic Content Insertion (DCI) to large numbers of devices may be difficult during traffic spikes. To enable each viewer to receive selected secondary content, when a break is announced in-band of the video stream, the DCI system typically has under ten seconds to perform N unique secondary content requests where N is the number of concurrent viewers. When N is sufficiently large (e.g., above 100,000), the secondary content system can be overwhelmed. In some implementations, the system can throttle responses after a certain of requests. This can result in a low fill rate of the content slots streaming to the concurrent viewers.

One possible method to mitigate the traffic spike is to pre-fetch content for the upcoming secondary content break (or open content slots). To retrieve an appropriate content item, the system needs to know the length of the content slot. With pre-scheduled content (e.g. broadcast television with secondary content breaks of known lengths predetermined by producers), this may be straightforward. However, with live or user-produced content, the length of the content slot may only be available to the server or client within a small window prior to the content slot, such as 5 seconds or less, limiting the ability of the system to pre-fetch content. The present system can predict open content slot durations across channels using advanced machine learning models.

Content streams for playback on a user device may include one or more playback breaks so that secondary content streams may be dynamically inserted into the content stream for playback during the breaks. Generally, markers are included in in-band messaging or metadata of the content stream to indicate a duration of an upcoming break so that the provider of the secondary content stream can provide a secondary content stream of a correct duration (i.e., a duration that best matches the duration of the break). In-band markers are normally provided only a short time before the break, such that a provider of secondary content has a correspondingly short window to prepare the secondary content for dynamic insertion into the content stream. The short windows have not generally presented problems where a single secondary content stream is to be provided to each of the user devices. However, it may be desirable to provide each user device with a secondary content stream that is specific to that user device (e.g. specific to a user of that user device). The Internet and related technologies have enabled geographically separate users to engage in "social viewing", whereby a group of users (who may be known to one another) view a first content stream simultaneously. During viewing of the content stream, reactions of one or more users in the group may be obtained in order to generate a secondary content stream for playback to other users in the group during a break in the first content stream. In a social viewing arrangement, therefore, users may be provided with secondary content streams that are specific to them (e.g. secondary content streams based upon other users within their group). This may be difficult to accommodate in a short time window provided by in-band markers within the first content stream.

In other implementations, a first content stream may not include a predetermined break. It may, however, be desirable to provide a break in the first content stream and to provide secondary content streams for playback during the break. During social viewing, users of a particular social viewing group may be streaming the first content stream over connections of differing bandwidth and therefore have different buffering requirements. It may therefore be desirable to determine a duration of a break into the first content stream that would allow viewing of the first content stream to be synchronized for each user of a social viewing group. It will be appreciated that the determination of a duration of a break in a first content stream may be useful in areas other than social viewing as will be apparent to the skilled person from the teaching herein.

By providing dynamic estimates of durations of breaks in first content streams, secondary content streams may be generated which better match those breaks. Further, such estimates may be generated in advance of any in-band markers that are provided within the first content streams, providing a longer window in which to generate and pre-cache secondary content streams which are specific to each of the plurality of user devices. Additionally, breaks may be determined that allow for first content to be watched simultaneously by a plurality of first users.

FIG. 1 illustrates a block diagram of a system 100 for predicting break durations in content streams. The system 100 includes a primary content publisher server 101 and a dynamic content insertion server 103 (also referred to as a content server 103), which includes a data processing system 107. The system also includes a secondary content server 102 and a plurality of client devices 104. The components of the system 100 communicate over a network 105. In some implementations, the network 105 may include a LAN network, a Wi-Fi network, a cellular network, a wide area network (WAN), a telephone network, such as the Public Switched Telephone Network (PSTN), a wireless link, a satellite link, a device-to-device mesh network, an intranet, the Internet, or combinations thereof.

Figure 2:
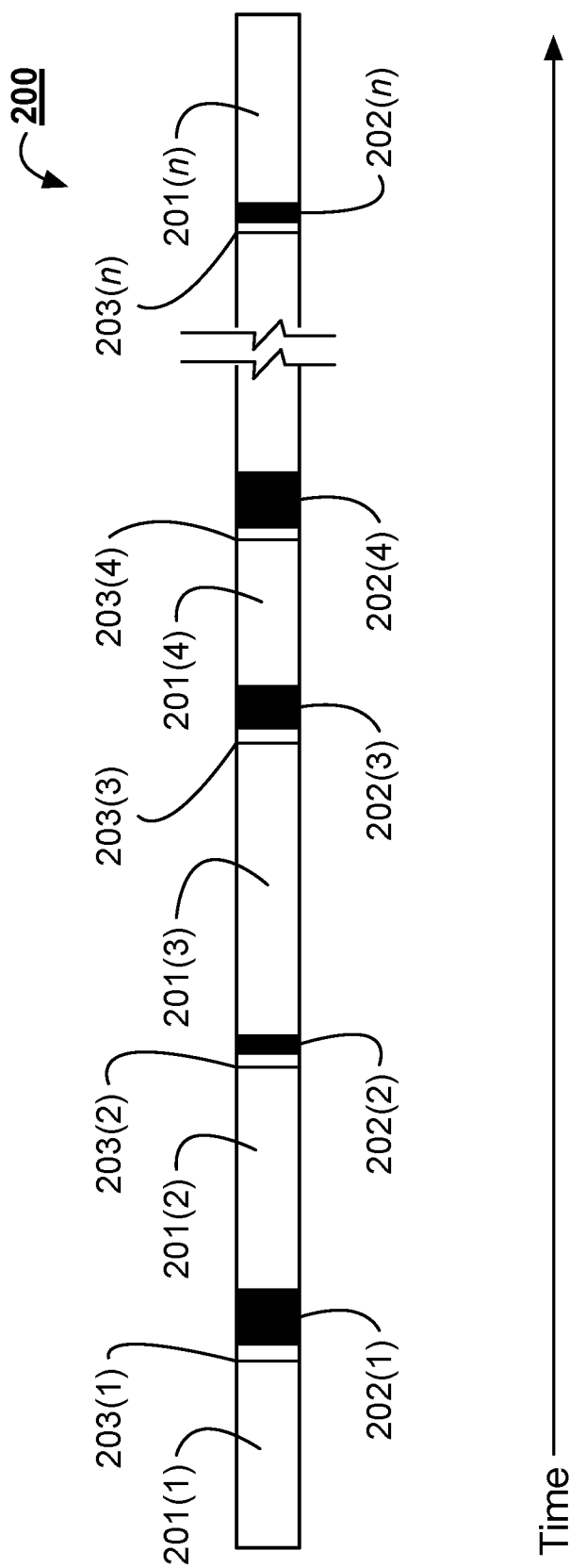
FIG. 2 illustrates a block diagram of an implementation of a content stream that can be streamed with the system illustrated in FIG. 1.

As an overview, and briefly referring to FIG. 2 also, the dynamic content insertion server 103 streams content streams to one or more client devices 104. FIG. 2 illustrates an implementation of a content stream 200. The content stream can be a video stream that includes primary content, such as, but not limited to, the video, audio, metadata, or subtitles of a movie, TV show, sporting event, or a news broadcast. The primary content can be divided into content segments 201, which can be separated from one another from secondary content slots 202. The secondary content server 102 can provide the content for the secondary content slots 202 and the primary content publisher server 101 can provide the primary content. While each of the plurality of client devices 104 can receive the same primary content stream, the secondary content provided to each of the client devices 104 can be selected by the secondary content server 102 for delivery to a specific client device 104. Each of the client devices 104 can receive a content stream for the same football game as the game is played live, however, the secondary content server 102 can select a customized secondary content item to be steamed to each of the client devices 104 during the secondary content slots of the football game.

Referring to FIG. 1, the primary content publisher server 101 and the secondary content server 102 can store content in their respective content databases 106. The dynamic content insertion server 103 can generate content streams that are transmitted to the plurality of client devices 104. The dynamic content insertion server 103 can transmit a copy of the same content stream to many of the client devices 104 at the same time. The content streams can include primary content that is provided by the primary content publisher server 101. The content streams can include secondary content slots. The secondary content server 102 can provide the content for the secondary content slots of the content stream. In some implementations, the content stream can include processor executable instructions that cause the client device 104 to fetch (or request) a secondary content item from the secondary content server 102 when the client device 104 reaches the secondary content slot. For example, a web browser on the client device can execute a video player that fetches secondary video content items from the secondary content server 102. The video player can then display the secondary video content when it is received form the secondary content server 102. The dynamic content insertion server 103 can also insert the secondary content items into the content stream such that the client device does not contact the secondary content server 102 to fetch the secondary content item.

The primary content publisher server 101 can include primary content that is stored in the server's respective database 106. The primary content can be provided to a plurality of the client devices 104 as content streams over the network 105. As described further in relation to FIG. 2, the content streams can include secondary content slots. The primary content can include video content, such as, but not limited to movies, television shows, sporting events, user generated video content, and audio content, such as podcasts.

The secondary content server 102 can include secondary content stored on the server's database 106. The secondary content can include supplemental content or related content that is supplied to fill the secondary content slots of the content stream.

The dynamic content insertion server 103 can include the data processing system 107, which includes a processor 108 that is in electrical communication with a memory 109. The memory stores instructions for a classifier 110 and a confidence scorer 111. The data processing system 107 also includes a classifier database 112 and a pre-fetched content database 113. The classifier database 112, the pre-fetched content database 113, and the database 106 can be stored in the memory 109.

The data processing system 107 can make predictions of the duration of upcoming secondary content slots in the content stream. As illustrated in FIG. 1, the data processing system 107 is a component of the dynamic content insertion server 103. In some implementations, the data processing system 107 can be a stand-alone server. In other implementations, the data processing system 107 can be a component of the secondary content server 102 or the primary content publisher server 101.

The classifier 110 can make predictions of the duration for an upcoming secondary content slots. After making a prediction of the duration of an upcoming secondary content slot, the data processing system 107 can pre-fetch secondary content for each of the client devices 104 receiving the content stream. The pre-fetched secondary content can be stored in the pre-fetched content database 113. When the client device 104 makes a request for secondary content to the secondary content server 102, the data processing system 107 can retrieve the pre-fetched secondary content from the pre-fetched content database 113 and transmit the pre-fetched secondary content to the requesting client device 104.

The classifier 110 can use machine learning to predict the duration of upcoming secondary content slots. In some implementations, the classifier 110 can use logistic regression to predict the length of the next secondary content slot. The logistic regression can provide the probability of the upcoming secondary content slot belonging to one of a group of classes (where each of the classes are associated with a different time duration). The logistic function can provide the probability F(x) of the upcoming secondary content slot x belonging to a class:

$$F(x) = \frac{1}{1 + e^{-(\beta_0 + \beta_1 x)}}$$

where $\beta_0$ and $\beta_1$ are the parameters defining the relationship between a single input feature and the class. The input feature can be an array of duration of past secondary content item slots. In addition to the array, other input features can include content stream ID, title, genre, total duration, display time, producer or publisher ID, or a combination thereof. Multinomial logistic regression can be used to classify the upcoming secondary content item into a class based on a plurality of input features by repeating the logistic regression for each of the input features.

The classifier 110 can predict the duration of upcoming secondary content slots using neural networks. In some implementations, the classifier 110 can use a recurrent neural network, such as a Long Short Term Memory (LSTM) neural network. An array of previous secondary content slot durations can be provided to the LSTM neural network. The values of the array can be associated with one or more input features that the LSTM uses to classify the upcoming secondary content slot duration into a class. In these implementations, the classifier 110 can classify an upcoming secondary content slot into classes that each correspond to different durations. The classes can be created by binning longest possible duration into non-overlapping classes. If the bin length was 5 seconds, slots between 0 and 5 seconds would be classified into the first bin, slots between 5 and 10 seconds into the second bin, slots between 10 and 15 seconds into the third bin, etc. The bin length can be between about 5 and 60 seconds, between about 5 and 30 seconds, or between about 5 and 15 seconds.

The LSTM neural network can include interconnected memory blocks in place of neurons. Each of the memory blocks can include gates that control the current state and output of the memory block. The gates can include a forget gate, input gate, and output gate. The forget gate can determine which information in the memory block is deleted, the input gate can determine which input information is used to update the memory block, and the output gate can determine what is output from the memory block. Each of the gates can include a sigmoid based function and a pointwise multiplication operation. An input into the memory block is first processed through the forget gate, which outputs a number between 0 (forget) and 1 (retain), which is multiplied against the memory block's current state to determine which values are forgotten and which are retained. The input gate can then determine which values are to be updated and generates new candidate values that are added to the memory block's current state. The memory block's current state then passes through the output gate. The output gate's sigmoid based function determines which values from the memory block's current state are output. Each of the gates include weights and biases that control operation of the gate. The weights and biases can be initially random values and then tunes through training of the neural network. The weights and biases can also be turned during the operation of the neural network on upcoming content slots. The training can include a gradient-based training, such as the Backpropagation Through Time method of training the LSTM neural network. The training of the classifier can be conducted offline—for example, prior to step 301 described below in relation to the method 300 illustrated in FIG. 3. The model generated during the offline training phase can be stored in a database of the data processing system. The classifier can generate a different model specifically for each of the different primary content publishers. For example, if each of the different primary content servers are associated with a different television channel, the classifier can generate a different model for each of the channels. The classifier can also generate a single model that can differentiate between publishers by characteristics such as a channel ID or a publisher ID.

The confidence scorer 111 can determine a confidence score that relates to the accuracy of the prediction. The confidence score can be calculated as a root mean squared error function. If confidence scorer 111 calculates a low confidence score for the prediction, the data processing system 107 may not pre-fetch secondary content or may pre-fetch secondary content of a default length.

Referring again to FIG. 2, and in greater detail, FIG. 2 illustrates a block diagram of an implementation of a content stream 200. The content stream 200 includes primary content segments 201(1)-201(n) (generally referred to as content segments 201). Each of the content segments 201 can be a portion of a primary content item or can be individual primary content items. The content segments 201 are separated by respective secondary content slots 202. The secondary content slots 202 can have different durations. The secondary content slots 202 can be between about 5 seconds and about 900 seconds in some implementations, although shorter and longer slots are also possible. The spacing between neighboring secondary content slots 202 (e.g., the length of the content segments 201) can also vary. The content stream 200 can also include indications 203 of content slot durations. An indication can precede each of the content slots 202. In the implementation illustrated, indication 203(2) precedes content slot 202(2). The indications 203 can precede the respective content slots 202 by a relatively short period of time. The time between the indication 203 and the content slot 202 can be between about 0 seconds and about 20 seconds, between about 0 seconds and about 15 seconds, between about 0 seconds and about 10 seconds, or between about 0 seconds and about 5 seconds, or any other such value or pair of values.

The dynamic content insertion server 103 can transmit the content stream 200 to the plurality of client devices 104. The primary content item can be a sporting event that the dynamic content insertion server 103 is streaming to each of the client devices 104. The secondary content slots 202 can be breaks that are inserted into the content stream 200. Each of the client devices can transmit a notification to the secondary content server that they are receiving the content stream 200. In some implementations, the dynamic content insertion server 103 can transmit a notification to the secondary content server 102 that the dynamic content insertion server 103 is transmitting the content stream 200 to the client devices 104. The content stream 200 can include instructions that instruct each of the client devices 104 to request content from the secondary content server 102. The instructions to request the content from the secondary content server 102 can be included in the content stream 200 substantially close in time to the secondary content slots 202. The instructions to request the content can be within 5 seconds of the start of the secondary content slots 202. Because each of the client devices 104 can be receiving a copy of the same content stream 200 (e.g., the client devices 104 are streaming the same sporting event), the requests for content from each of the client devices 104 are received by the secondary content server 102 within a short duration of when the secondary content server 102 needs to transmit the secondary content to the client device 104. If N client devices 104 are receiving the content stream 200, the secondary content server 102 must perform N lookups for secondary content prior to the start of the secondary content slot 202. In some implementations, the secondary content server 102 can handle X lookups for a given time period. When N is larger than X, the secondary content server cannot perform the lookups in the allotted time and cannot return secondary content to each of the client devices 104. When N is larger than X, the secondary content server can make predictions about the length and occurrence of the upcoming secondary content slot 202. The prediction can be made at substantially enough time before the occurrence of the secondary content slot 202 such that the data processing system can pre-fetch and store secondary content items for each of the client devices.

Figure 3:
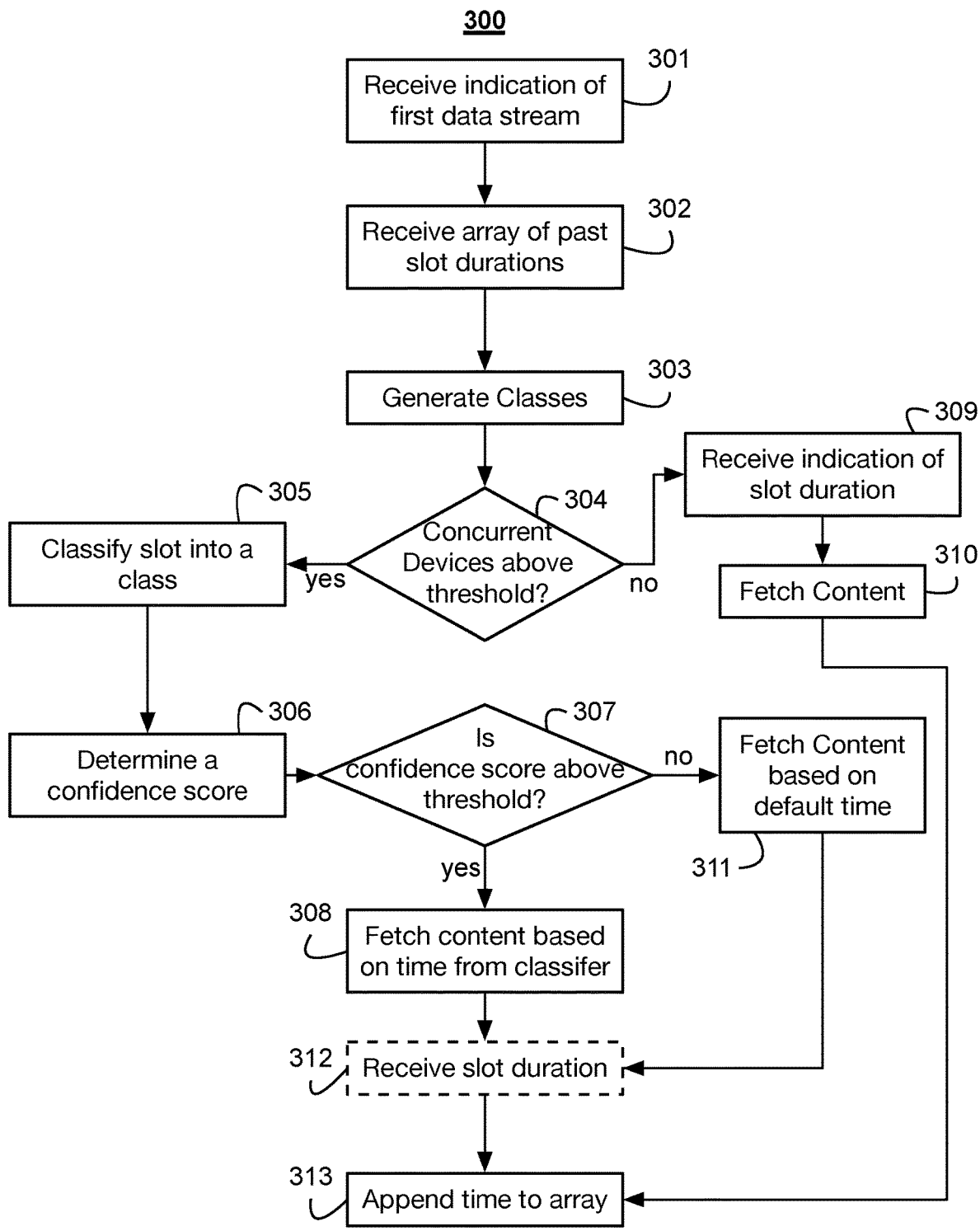
FIG. 3 illustrates a block diagram of a method for predicting content slot duration using the system illustrated in FIG. 1.

FIG. 3 illustrates a block diagram of a method 300 for predicting content slot duration. As an overview of the steps of method 300, the method 300 includes the data processing system receiving an indication of a data stream that is transmitted to one or more client devices (step 301). The data processing system can receive an array of past secondary content slot durations (step 302). The method 300 can also include generating a plurality of different classes (step 303). The method 300 can include determining if a number of devices concurrently receiving the first data stream is above a threshold (step 304). If the number is above the threshold, the method 300 can include classifying the upcoming secondary content slot into one of the plurality of classes (step 305). The data processing system can determine a confidence score of the classification of the upcoming secondary content slot (step 306). If at step 307, the confidence score is above a threshold, the data processing system can fetch a secondary content item (step 308).

Returning to step 304, if the number of concurrent devices is below the threshold, the data processing system can wait until an indication secondary content slot's actual duration is received (step 309). The data processing system can retrieve a secondary content item based on the slot's actual duration (step 310). In some implementations, step 304 can occur after step 301 such that steps 302 and 303 only occur if the number of concurrent devices is above the threshold. Determining if the number of concurrent devices is above the threshold earlier in the method 300 can reduce computational waste because steps 302 and 303 would not be performed in cases where the classifier ultimately does not make a classification.

Returning to step 307, if the confidence score is below the threshold, the data processing system can fetch a secondary content item based on a default duration (step 311). In some implementations, the data processing system can fetch the secondary content item based on the last measured duration. The method 300 can include measuring the actual duration of the content slot's duration (step 312). The duration of the content slot can be appended to the array of past content slot durations (step 313).

As discussed above, and in greater detail, the method 300 can include receiving an indication of a first data stream (step 301). The data stream can be transmitted to a plurality of client devices. The data stream can include primary content and one or more secondary content slots. The content stream can be similar to the content stream discussed above in relation to FIG. 2. The content stream can include a video that is streamed to one or more client devices from a dynamic content insertion server. As the dynamic content insertion server transmits the content stream to the client device, the dynamic content insertion server can transmit an indication to a data processing system that the content stream is being streamed to the client device. In other implementations, when a client device receives a content stream, the client device can send an indication to the data processing system that the client device is receiving the video of the content stream. The indication can include an identification of the content stream and the receiving client device (or list thereof).

The method can also include receiving an array of past secondary content slot durations (step 302). The array can be retrieved by the data processing system. The data processing system can maintain a database of the durations of prior secondary content slots. The array can include prior content slot durations of the currently streamed content item. The array can include prior content slot durations of any content from the primary content publisher content server. The array can include durations of the last five secondary content slots, or a larger or fewer number of content slots. The array can include between the duration of the last 5 and 20, 5 and 15, or 5 and 10 secondary content slots. The array can include the duration of the secondary content slots included in the content stream over the past 30 minutes, 1 hour, 2 hours, 6 hours, 1 day, or 1 week. The array can include prior secondary content slot durations that match a characteristic of the currently streamed content item. In some implementations, the data processing system can determine characteristics of the content stream. The characteristics of the content stream can include content stream ID, title, genre, total duration, display time, producer, or a combination thereof. The secondary content can take any form, including advertisements. At step 302, the data processing system can also retrieve characteristics of the content stream such as genre, time of day, day of the week, publisher ID, or a combination thereof.

The method 300 can also include generating classes (step 303). The data processing system can determine the possible classes into which the secondary content slot can be classified. In some implementations, the classes are based on possible secondary content slot durations. In one such implementation, each of the classes can be about 5 seconds long. In a case where the longest possible content slot is 900 seconds, class 1 can be 0-5 seconds, class 2 can be 5-10 seconds, . . . , class 180 can be 895-900 second. In some implementations, only a portion of the possible classes are used. The selection of the portion of possible classes can be based on one or more characteristics of the content stream such as genre, time of day, day of the week, or a combination thereof. In some implementations, during movies the secondary content slots can be more likely to have a duration of 30 seconds, 1 minute, 1.5 minutes, or 2 minutes; and the classes corresponding to 30 seconds, 1 minute, 1.5 minute, and 2 minute durations can be selected as the portion of possible classes. For other genres or types of content, different durations may be employed. For a content stream of a sporting event, the secondary content items may have more varied durations. The system can select a greater portion of the possible classes (or all of the possible classes) to use.

The method 300 can include determining if the number of concurrent devices receiving the content stream is above a threshold (step 304). When the number of concurrent devices receiving the content stream is below the threshold, the data processing system can retrieve a secondary content item for each of the devices within the time between the receipt of the secondary content slot's duration and the beginning of the secondary content slot. As described above, the content stream can include an indication of the length of the secondary content slot. The indication of the length can be included in the content stream a predetermined amount of time before the start of the secondary content slot (e.g., the indication can precede the start of the secondary content slot by about 5 seconds). When the number (n) of concurrent devices is below the threshold, the data processing system can fetch secondary content items n number of times between the receipt of the indication and the beginning of the secondary content slot. The threshold for step 304 can be between about 25,000 and about 500,000, between about 50,000 and about 250,000, or between about 100,000 and about 250,000 concurrent devices.

When the number of concurrent devices is below the threshold, the data processing system can wait for the receipt to the secondary content slot's duration. The secondary content server can receive an indication of the secondary content slot duration (step 309). Once the data processing system knows the duration of the content slot, the data processing system can fetch a secondary content item with a duration that matches (or is shorter than) the duration of the content slot (step 310). The data processing system can fetch a secondary content item for each of the computing devices concurrently receiving the content stream.

Returning to step 304, when the number of devices concurrently receiving the content stream is above the predetermined threshold, the data processing system can predict the length of the next secondary content slot by classifying the upcoming secondary content slot into one of the classes generated during step 303 (step 305). The classifier can predict the upcoming secondary content slot duration by classifying the secondary content slot into one of a plurality of classes. As described above, the data processing system can predict the length of the upcoming secondary content slot using a neural network, such as a LSTM neural network. The classifier can use the array received at step 302 as input into the classifier. The classifier can use characteristics of the content stream as input. The previous content slots can be used as input into the LSTM neural network. The times of the previous content slot durations can be used as expected outputs (or dependent variables) for the LSTM neural network. The characteristics of the content slot durations can be input features (or independent variables) that are input into the LSTM neural network to generate the expected outputs. The LSTM neural network can be trained using the data contained in the array. The LSTM neural network can be trained using gradient descent and back-propagation techniques to generate the weights and biases that the LSTM neural network uses to classify secondary content slots of the content stream.

The method 300 can include calculating a confidence score for the classification (step 306). The data processing system can calculate a confidence interval using a root mean squared error function of the classification. The confidence score can be based on the number of past slot durations stored in the array received at step 302. The classifier can use the past durations stored in the array to calculate a root mean squared error between the actual past durations and the durations predicted by the neural network or other model of the classifier. The root mean squared error function can represent the standard deviation of the differences between predicted durations and observed durations stored in the array. In some implementations, when the number of slot durations in the array is low (e.g., below 5), as can happen at the beginning of a content stream, the confidence score can be low. As the secondary content server makes more classifications, the confidence of subsequent classifications can be increased. The confidence score can be the accuracy that was observed during an offline training of the classifier for content streams from the publisher associated with the current content stream.

If the confidence score is below a predetermined threshold, the data processing system can fetch a content item based on a default duration (step 311). If the confidence score is below 60%, 70%, 80%, 90%, or 95%, the data processing system can fetch the content item based on a default duration. In some implementations, the default duration can be 30 seconds. The default duration can be the most common duration included in the content stream or the average of the past secondary content slot durations.

If the confidence score is above the predetermined threshold, the data processing system can fetch a content item based on the duration from the classifier (step 308). The data processing system can retrieve a secondary content item for each of the client devices concurrently receiving the content stream. The data processing system can save the secondary content item as a pre-fetched content item into the pre-fetched content database.

The method 300 can also include receiving the duration of the secondary content slot (step 312). Receiving the actual duration of the content slot can be an optional step. When the data processing system receives the actual secondary content slot duration, the actual secondary content slot duration can be appended to the array in step 313. In other implementations, when step 312 is skipped, the predicted secondary content slot duration can be appended to the array in step 313. Using the actual secondary content slot duration can enable the data processing system to improve the accuracy of the classifier. The predicted and actual duration can be compared to strengthen the connections within the neural network.

The method 300 can also include appending the duration to the array (step 313). The measured or predicted content slot duration can be appended to the array received during step 302. Increasing the number of secondary content slot durations in the array can increase the accuracy of the prediction made at step 305.

Accordingly, disclosed herein are systems and methods for providing content to a plurality of client devices. According to one aspect of the disclosure, a system for providing content to a plurality of client devices includes at least one computing device that includes at least one processor and at least one memory device. The at least one processor executes a classifier. The classifier is configured to receive an indication of a first content stream that is transmitted to a plurality of client devices. The first content stream includes a content item and a secondary content item slot. The classifier may also be configured to receive an array that includes durations of a plurality of past secondary content item slots. The past secondary content item slots may be associated with the content stream or may be associated with other content streams. The classifier is also configured to determine for the first content stream, a plurality of classes. Each of the plurality of classes is associated with a different time duration of a corresponding plurality of time durations. The classifier is also configured to classify the secondary content item slot for the first content stream into a first class of the plurality of classes. The classifier may also configured to transmit an indication of the time duration of the first class of the plurality of classes into which the secondary content item slot was classified to a secondary content server.

The dynamic content insertion server may be provided by the same computing device executing the classifier. Transmitting the indication of the time duration may comprise any way of making the indication of the time duration available to the dynamic content insertion server. Where an array including durations of a plurality of past secondary content items slots is received, determination of a plurality of classes for the first content stream may be based at least partially upon the array.

The dynamic content insertion server can be configured to select, responsive to the transmitted indication of the time duration, a second content item for each of the plurality of client devices to display during the secondary content item slot of the first content stream. The selection of a second content item for a particular client device may be further based upon a characteristic of that client device. The dynamic content insertion server may transmit the respective selected second content items to the client devices. The classifier can be configured to calculate a confidence score for the classification of the secondary content item slot into the first class of the plurality of classes. The classifier can also determine that the confidence score is below a predetermined threshold and select a second content item having a default time duration. The second content item with the default time duration can be placed in the secondary content item slot of the first content stream responsive to the determination that the confidence score is below the predetermined threshold.

The classifier can be configured to determine that a number of the plurality of client devices concurrently receiving the content stream is below a predetermined threshold. The classifier can receive an indication of the duration of the length of the secondary content item slot for the secondary content item. The classifier can select a second content item to place into the secondary content item slot of the first content stream responsive to the indication of the duration of the length of the secondary content item slot for the secondary content item The classifier can be configured to receive a publisher identifier of the first content stream and a display time of the first content stream. The classifier can classify the secondary content item slot into the one of the plurality of classes based on the publisher identifier and the display time. The classifier can be configured to set one or more weights of a classification model based on the publisher identifier. Each of the durations in the array can be time durations of previously measured slots in the first data stream.

The classifier can be configured to determine a content stream characteristic of the first data stream and determine, for the first content stream, the plurality of classes based on the content stream characteristic. The classifier can be a long term-short term neural network.

According to another aspect of the disclosure, a method for providing content to a plurality of client devices includes receiving, by a classifier executed by at least one processor of a computing device, an indication of first content stream transmitted to a plurality of client devices. The first content stream can include a content item and a secondary content item slot. The method can include receiving, by the classifier, an array that includes durations of a plurality of secondary content item slots associated with the content stream. The method can include determining, by the classifier, for the first content stream, a plurality of classes. Each of the plurality of classes can be associated with a different time duration of a corresponding plurality of time durations. The method can include classifying, by the classifier, the slot for the secondary content item into a first class of the plurality of classes. The method can include transmitting, by the classifier to a dynamic content insertion server, an indication of the time duration of the first class.

The dynamic content insertion server may be provided by the same computing device executing the classifier. Transmitting the indication of the time duration may comprise any way of making the indication of the time duration available to the dynamic content insertion server. Where an array including durations of a plurality of past secondary content items slots is received, determination of a plurality of classes for the first content stream may be based at least partially upon the array.

The method can include selecting by the classifier, responsive to the transmitted indication of the time duration, a second content item for each of the plurality of client devices to display during the secondary content item slot of the first content stream.

The method can include calculating, by the classifier, a confidence score for the classification of the secondary content item slot into the first class of the plurality of classes and determining that the confidence score is below a predetermined threshold. The method can include selecting a second content item having a default time duration to place in the secondary content item slot of the first content stream.

The method can include determining a number of the plurality of client devices is below a predetermined threshold. The method can include receiving an indication of the duration of the length of the secondary content item slot. The method can include selecting a second content item to place into the secondary content item slot of the first content stream responsive to the indication of the duration of the length of the secondary content item slot for the secondary content item. The selection can be responsive to the determination that the number of the plurality of client devices is below the predetermined threshold.

The method can include receiving, by the classifier, a publisher identifier of the first content stream and a display time of the first content stream. The method can include classifying, by the classifier executed by the processors of the data processing system, the secondary content item slot into the one of the plurality of classes based on the publisher identifier and the display time. The method can include selecting one or more weights of a classification model based on the publisher identifier. Each of the durations in the array can be time durations of previous secondary content item slots in the first data stream.

The method can include determining a content stream characteristic of the first data stream, and determining, by the classifier, for the first content stream, the plurality of classes based on the content stream characteristic. The classifier can be a long term-short term neural network. The method can include receiving a duration of the secondary content item slot and updating the array to include the duration of the secondary content item slots.

Figure 4:
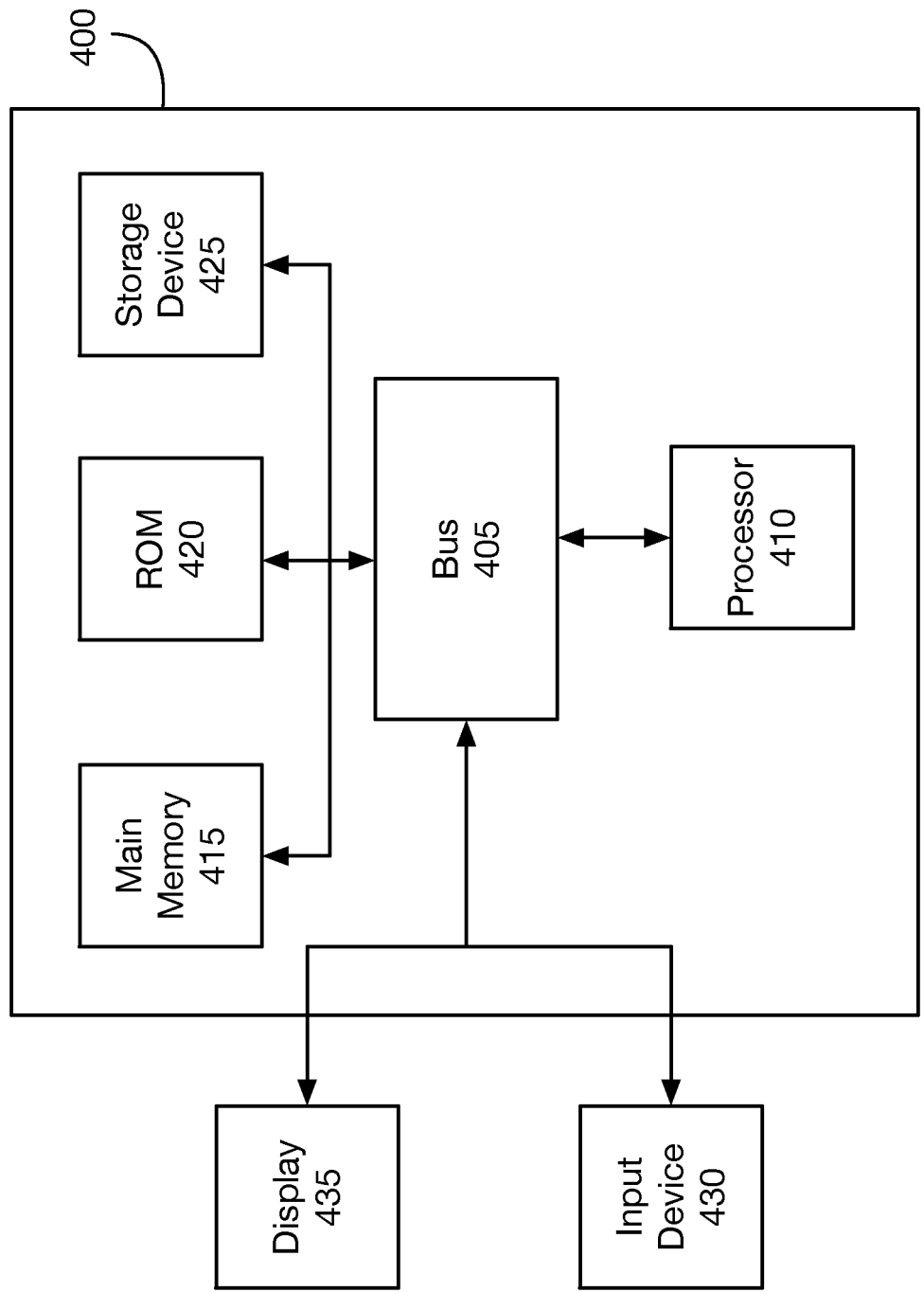
FIG. 4 illustrates a block diagram of an implementation of a computer system.

FIG. 4 illustrates a block diagram of an implementation of a computer system 400. The computer system or computing device 400 can include or be used to implement the system 100 or its components such as the dynamic content insertion server 103. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 105, the client computing device 150 or other components of FIG. 1.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components described above in relation to FIG. 1 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad-hoc peer-to-peer networks).

The computing system such as system 100 or system 400 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system from the client device or the content provider computing device or the service provider computing device).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A system for providing content to client devices, comprising a computing device comprising a processor and a memory device, the processor executing a classifier, the classifier configured to:
   receive an indication of a first content stream transmitted to a plurality of client devices, the first content stream comprising a content item and a secondary content item slot;
   receive an array comprising durations of a plurality of secondary content item slots associated with the first content stream;
   determine for the first content stream, a plurality of classes, each of the plurality of classes associated with a different time duration of a corresponding plurality of time durations;
   classify the secondary content item slot of the first content stream into a first class of the plurality of classes based on the array comprising durations of the plurality of secondary content item slots associated with the first content stream;
   prefetch and store, based on a time duration of the first class of the plurality of classes into which the secondary content item slot was classified, a secondary content item for each of the plurality of client devices, wherein the classifier comprises a recurrent neural network;
   calculate a confidence score for the classification of the secondary content item slot into the first class of the plurality of classes;
   determine that the confidence score is below a predetermined threshold; and
   select a second content item having a default time duration to place in the secondary content item slot of the first content stream responsive to the determination that the confidence score is below the predetermined threshold.

2. The system of claim 1, wherein the classifier is further configured to select, responsive to the time duration of the first class, a different second content item for each of the plurality of client devices to display during the secondary content item slot of the first content stream.

3. The system of claim 1, wherein each of the durations in the array are time durations of previously measured slots in the first content stream.

4. The system of claim 1, wherein the classifier is further configured to:
   determine a content stream characteristic of the first content stream; and
   determine, for the first content stream, the plurality of classes based on the content stream characteristic.

5. The system of claim 1, wherein the recurrent neural network is a long term-short term neural network.

6. The system of claim 1, wherein the classifier is further configured to:
   receive a duration of the secondary content item slot; and
   update the array to include the duration of the secondary content item slot.

7. A system for providing content to client devices, comprising a computing device comprising a processor and a memory device, the processor executing a classifier, the classifier configured to:
   receive an indication of a first content stream transmitted to a plurality of client devices, the first content stream comprising a content item and a secondary content item slot;
   receive an array comprising durations of a plurality of secondary content item slots associated with the first content stream;
   determine for the first content stream, a plurality of classes, each of the plurality of classes associated with a different time duration of a corresponding plurality of time durations;
   classify the secondary content item slot of the first content stream into a first class of the plurality of classes based on the array comprising durations of the plurality of secondary content item slots associated with the first content stream;
   prefetch and store, based on a time duration of the first class of the plurality of classes into which the secondary content item slot was classified, a secondary content item for each of the plurality of client devices, wherein the classifier comprises a recurrent neural network;
   determine a number of the plurality of client devices is below a predetermined threshold;
   receive an indication of a duration of a length of the secondary content item slot for the secondary content item; and
   select a second content item to place into the secondary content item slot of the first content stream responsive to the indication of the duration of the length of the secondary content item slot for the secondary content item, responsive to the determination that the number of the plurality of client devices is below the predetermined threshold.

8. A system for providing content to client devices, comprising a computing device comprising a processor and a memory device, the processor executing a classifier, the classifier configured to:
   receive an indication of a first content stream transmitted to a plurality of client devices, the first content stream comprising a content item and a secondary content item slot;
   receive an array comprising durations of a plurality of secondary content item slots associated with the first content stream;
   determine for the first content stream, a plurality of classes, each of the plurality of classes associated with a different time duration of a corresponding plurality of time durations;
   receive a publisher identifier of the first content stream and a display time of the first content stream;
   classify the secondary content item slot into a first class of the plurality of classes based on the array comprising durations of the plurality of secondary content item slots associated with the first content stream, the publisher identifier, and the display time; and prefetch and store, based on a time duration of the first class of the plurality of classes into which the secondary content item slot was classified, a secondary content item for each of the plurality of client devices, wherein the classifier comprises a recurrent neural network.

9. The system of claim 8, wherein the classifier is further configured to select one or more weights of a classification model based on the publisher identifier.

10. A method for providing content to client devices, comprising:
receiving, by a classifier comprising a recurrent neural network and executed by a processor of a computing device, an indication of a first content stream transmitted to a plurality of client devices, the first content stream comprising a content item and a secondary content item slot;
receiving, by the classifier, an array comprising durations of a plurality of secondary content item slots associated with the first content stream;
determining, by the classifier, for the first content stream, a plurality of classes, each of the plurality of classes associated with a different time duration of a corresponding plurality of time durations;
classifying, by the classifier, the secondary content item slot into a first class of the plurality of classes based on the array comprising durations of the plurality of secondary content item slots associated with the first content stream;
prefetching and storing, by the classifier, based on a time duration of the first class, a secondary content item for each of the plurality of client devices;
calculating, by the classifier, a confidence score for the classification of the secondary content item slot into the first class of the plurality of classes;
determining, by the classifier, that the confidence score is below a predetermined threshold; and
selecting, by the classifier, a second content item having a default time duration to place in the secondary content item slot of the first content stream responsive to the determination that the confidence score is below the predetermined threshold.

11. The method of claim 10, further comprising selecting by the classifier, responsive to the time duration of the first class, a different second content item for each of the plurality of client devices to display during the secondary content item slot of the first content stream.

12. The method of claim 10, wherein each of the durations in the array are time durations of previous secondary content item slots in the first content stream.

13. The method of claim 10, further comprising:
determining a content stream characteristic of the first content stream; and
determining, by the classifier, for the first content stream, the plurality of classes based on the content stream characteristic.

14. The method of claim 10, wherein the recurrent neural network is a long term-short term neural network.

15. The method of claim 10, further comprising:
receiving a duration of the secondary content item slot; and
updating the array to include the duration of the secondary content item slot.

16. A method for providing content to client devices, comprising:

receiving, by a classifier comprising a recurrent neural network and executed by a processor of a computing device, an indication of a first content stream transmitted to a plurality of client devices, the first content stream comprising a content item and a secondary content item slot;
receiving, by the classifier, an array comprising durations of a plurality of secondary content item slots associated with the first content stream;
determining, by the classifier, for the first content stream, a plurality of classes, each of the plurality of classes associated with a different time duration of a corresponding plurality of time durations;
classifying, by the classifier, the secondary content item slot into a first class of the plurality of classes based on the array comprising durations of the plurality of secondary content item slots associated with the first content stream;
prefetching and storing, by the classifier, based on a time duration of the first class, a secondary content item for each of the plurality of client devices;
determining, by the classifier, a number of the plurality of client devices is below a predetermined threshold;
receiving, by the classifier, an indication of a duration of a length of the secondary content item slot; and
selecting, by the classifier, a second content item to place into the secondary content item slot of the first content stream responsive to the indication of the duration of the length of the secondary content item slot for the secondary content item, responsive to the determination that the number of the plurality of client devices is below the predetermined threshold.

17. A method for providing content to client devices, comprising:
receiving, by a classifier comprising a recurrent neural network and executed by a processor of a computing device, an indication of a first content stream transmitted to a plurality of client devices, the first content stream comprising a content item and a secondary content item slot;
receiving, by the classifier, an array comprising durations of a plurality of secondary content item slots associated with the first content stream;
determining, by the classifier, for the first content stream, a plurality of classes, each of the plurality of classes associated with a different time duration of a corresponding plurality of time durations;
receiving, by the classifier, a publisher identifier of the first content stream and a display time of the first content stream;
classifying, by the classifier, the secondary content item slot into a first class of the plurality of classes based on the array comprising durations of the plurality of secondary content item slots associated with the first content stream, the publisher identifier, and the display time; and
prefetching and storing, by the classifier, based on a time duration of the first class, a secondary content item for each of the plurality of client devices.

18. The method of claim 17, further comprising selecting one or more weights of a classification model based on the publisher identifier.

* * * * *